US006976514B2

(12) United States Patent
Wagner et al.

(10) Patent No.: US 6,976,514 B2
(45) Date of Patent: Dec. 20, 2005

(54) PRESSING ELEMENT OF A MACHINE FOR MACHINING WOOD OR PLASTIC WORKPIECES AND METHOD AND DEVICE FOR ADJUSTING SUCH PRESSING ELEMENT

(75) Inventors: Ralf Wagner, Hardheim (DE); Winfried Reuter, Igersheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 87 days.

(21) Appl. No.: 10/079,210

(22) Filed: Feb. 20, 2002

(65) Prior Publication Data

US 2002/0112780 A1 Aug. 22, 2002

(30) Foreign Application Priority Data

Feb. 21, 2001 (DE) ................................ 101 08 249

(51) Int. Cl.[7] ........................... B27C 1/00; B30B 13/00

(52) U.S. Cl. ................. 144/114.1; 144/116; 144/136.1; 100/35; 409/174; 409/125

(58) Field of Search .......................... 144/114.1, 117.1, 144/246.1, 248, 368, 373, 375, 116, 242.1, 144/250.12, 250.13; 409/194, 218; 83/466

(56) References Cited

U.S. PATENT DOCUMENTS

| | | | | |
|---|---|---|---|---|
| 2,699,804 A | | 1/1955 | Starnes | 144/253.1 |
| 4,989,443 A | * | 2/1991 | Sawdon | 72/402 |
| 4,993,464 A | * | 2/1991 | Englert | 144/321 X |
| 5,007,469 A | * | 4/1991 | Englert et al. | 144/136.1 |
| 5,290,988 A | | 3/1994 | Young | 219/69.17 |
| 5,415,212 A | | 5/1995 | Lenton | 144/243 |
| 5,477,899 A | * | 12/1995 | Schmitt | 144/116 |
| 6,505,491 B2 | * | 1/2003 | Ochi et al. | 72/224 |

FOREIGN PATENT DOCUMENTS

| | | |
|---|---|---|
| DE | 26 17 617 | 11/1977 |
| DE | 197 56 503 | 6/1999 |
| GB | 205 657 | 10/1923 |

* cited by examiner

*Primary Examiner*—Derris H. Banks
*Assistant Examiner*—Shelley Self
(74) *Attorney, Agent, or Firm*—Gudrun E. Huckett

(57) ABSTRACT

In a method for adjusting at least one pressing element of a molding machine for machining workpieces of wood or plastic material relative to a workpiece, transported through the machine and to be machined by the machine, the pressing element is adjusted outside of the molding machine in an adjusting device with the aid of a template of the workpiece and the adjusted pressing element is then inserted into the molding machine.

32 Claims, 5 Drawing Sheets

19
20
30
34
40
43
44
45
46
47
48
49
50
51
52
53
54
55
56
57
58
59
60
66
67
68
69
70
74
81
82
83
84
95

PRESSING ELEMENT OF A MACHINE FOR MACHINING WOOD OR PLASTIC WORKPIECES AND METHOD AND DEVICE FOR ADJUSTING SUCH PRESSING ELEMENT

BACKGROUND OF THE INVENTION

1. Field of the Invention

The invention relates to a method for adjusting, relative to the workpiece to be transported through the machine and to be machined by the machine, at least one pressing element of a machine for machining workpieces of wood, plastic material or the like. The invention further relates to a device for performing such a method as well as a pressing element having a strip-shaped base member for use in such a device.

2. Description of the Related Art

In connection with woodworking machines it is known to machine the workpieces on four sides while passing through the machine. Often, the top side of the workpiece is provided with a profile when these workpieces are used, for example, for manufacturing furniture molding. Manufacturing such profiles is carried out by means of a tool mounted on a horizontal spindle and positioned above the transport path of the workpiece through the machine. This top spindle has arranged downstream thereof a bottom spindle whose tool machines the underside of the workpiece directly subsequently to the machining of the top side. In order for the workpiece to be resting properly on the transport path during machining by the tools, a pressing element is arranged in the transport direction of these workpieces directly behind the top spindle and in the area above the lower spindle. It is configured as a plate which has a planar contact side with which the pressing element presses onto the workpiece moving through underneath it. When the top side of the workpieces is profiled, the pressing action on the workpieces is insufficient because the pressing element often only rests against the workpiece over a short length or an edge of the profile area of the workpiece. The workpieces could therefore tilt when passing underneath this pressing element so that the machining quality and precision are impaired.

For this reason, it is also known to provide the pressing elements at their contact side with a counter profile for the workpiece to be supported. Such pressing elements must be manufactured with the aid of a sample workpiece, mounted in the machine and adjusted therein. However, this is complex, expensive, and requires a considerable time expenditure.

SUMMARY OF THE INVENTION

It is an object of the present invention to configured the method, the device, and the pressing element of the aforementioned kind such that a reliable and problem-free supporting action of profiled workpieces is possible.

This object is solved in regard to the method in that the pressing element is adjusted outside of the machine in an adjusting device and is inserted into the machine after completion of the adjusting process. This object is further solved in regard to the device in that the device has at least one holder for at least one carrier on which the pressing element is provided. This object is further solved in regard to the pressing element in that on the base member at least one pressing member is moveably supported.

According to the method of the present invention, the pressing element is no longer adjusted within the machine itself but outside thereof in an adjusting device. In such an adjusting device, the pressing element can be positioned without problems in its precise supporting position. After this adjustment is completed, the pressing element is removed from the adjusting device and inserted into the machine.

The device according to the present invention is provided with a holder with which the carrier for the pressing element can be fastened. The pressing element can then be adjusted simply and precisely on the carrier in the required position.

The pressing element according to the invention is at least of a two-part configuration and comprises the base member on which the pressing member is moveably supported. Since the base member and the pressing member are movable relative to one another, the pressing member can be adjusted relative to the base member such that it rests properly on the workpiece to the machined.

BRIEF DESCRIPTION OF THE DRAWING

In the drawing:

FIG. 5*a* shows a side view of a first embodiment of the pressing element according to the invention;

FIG. 5*b* shows a side view of a second embodiment of the pressing element according to the invention;

FIG. 5*c* shows a side view of a third embodiment of the pressing element according to the invention;

DESCRIPTION OF THE PREFERRED EMBODIMENTS

Figure 1:
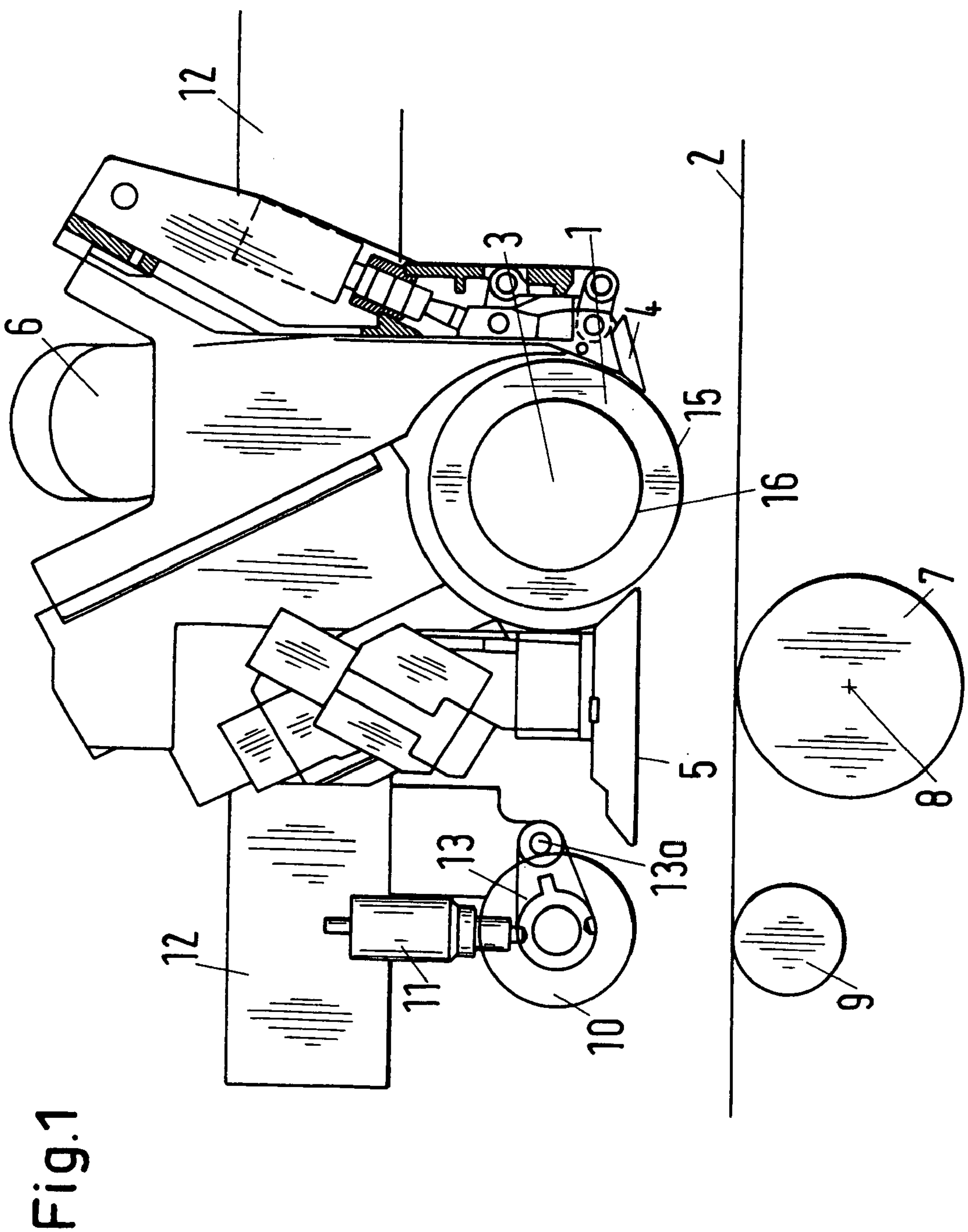
FIG. 1 is a side view of a part of a molding machine with a pressing device according to the present invention.

FIG. 1 shows a part of a molding machine on which workpieces, preferably of wood, are machined on four sides when passing through the machine. Such a molding machine is known and will therefore be described only briefly in this context. It has a transport path 2 on which the workpieces to be machines are transported through the molding machine by means of feed rollers on which the workpieces are supported. Upon passing through the molding machine, the underside of the workpieces are first machined, for example, planed, by a tool seated on a horizontal spindle below the transport path. Upon further passing through the molding machine, the workpieces are machined on their two longitudinal sides by tools which are seated on vertical spindles positioned to the right and to the left adjacent to the transport path, respectively. Upon further transport through the molding machine, the workpieces reach the working area of a tool 1 (FIG. 1) which is fixedly seated on a horizontal spindle 3 arranged in the area above the transport path 2. In the transport direction before and behind the tool 1, a pressing device 4, 5 is arranged, respectively. The pressing device 4 in front of the tool 1 is configured as a pressure shoe, as is known in the art, which rests under the force of a spring on the upper side of the workpiece and properly pushes it against the transport path 2. This ensures that the workpiece to be machined is fed properly to the tool 1 with which the top side of the workpiece is machined. The pressing device 4 can be adjusted, as is known in the art, relative to the circle described by the rotating tool 1.

The pressing device 5 arranged in the transport direction behind the tool 1 can also be adjusted relative to the circle described by the rotating tool in a way known in the art. The tool 1 with the spindle 3 and the pressing devices 4, 5 can be adjusted, for accommodating different workpiece thicknesses, perpendicularly to the transport path 2 in a way known in the art. The cuttings which are produced upon processing of the workpieces by the tool 1 are removed by suction by the suction hood 6, as is known in the art.

The pressing device 5 is arranged in the area above a tool 7 which is fixedly seated on a horizontal spindle 8 positioned underneath the transport path 2 and with which the workpiece is machined at its underside. The pressing device 5 ensures that the workpiece during this machining is pressed properly against the transport path 2.

In the transport direction of the workpiece behind the spindle 8 a table roller 9 is provided which is seated on a horizontal axle arranged in the area underneath the transport path 2.

FIG. 1 shows also a transport roll 10 which is forced onto the workpiece in a way known in the art by means of a pressure cylinder 11. The pressure cylinder 11 projects downwardly from an advancing beam 12 which extends, as is known in the art, at a spacing above the spindle 3 in the transport direction through the molding machine. Transport rollers 10 are provided on the beam 12 also in the area before the spindle 3. The transport roller 10 is supported in a self-aligning housing 13 which is pivotably supported in a self-aligning bearing 13*a*. It is provided on the advancing beam 12 or is a fixed component thereof.

Figure 2:
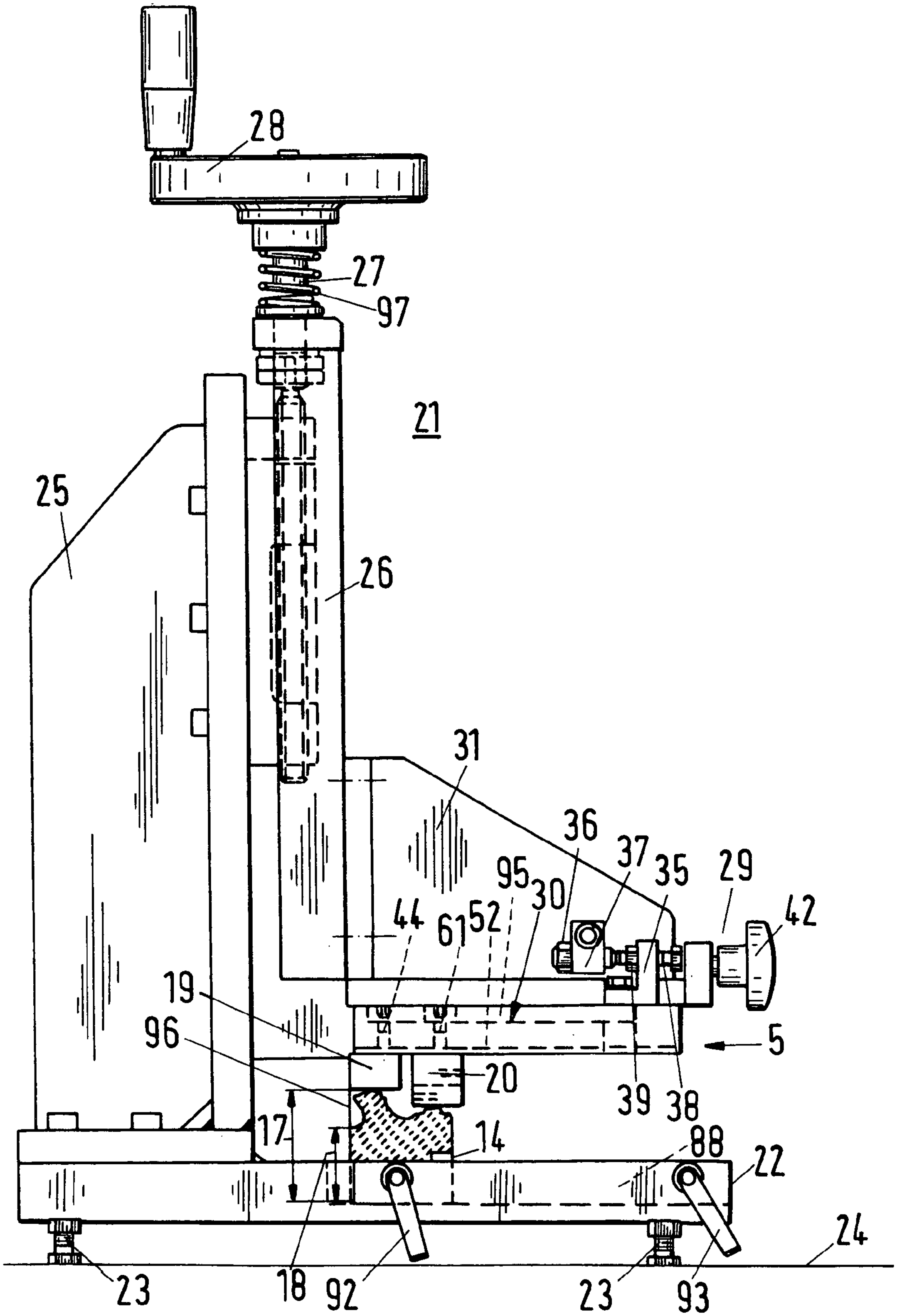
FIG. 2 is a side view of an adjusting device according to the invention for the pressing device according to the invention.

Often the workpieces are provided at least at their top side with a profiling by means of the tool 1. FIG. 2 shows as an example a template 14 of such a workpiece whose top side is profiled. The cutting blades of the tool 1 are provided at their edge with a corresponding profile. FIG. 1 shows for such a profiled culling blade the maximum described circle 15 and the minimum described circle 16. The smallest described circle 16 corresponds to the greatest thickness 17 (FIG. 2) of the workpiece while the maximum described circle 15 corresponds to the smallest thickness 18 of the workpiece. Accordingly, the difference of smallest and greatest described circles 15, 16 determines the maximum depth of the profile of the workpiece, the so-called molding depth. As a result of the top side profiling, for example, illustrated in FIG. 2, the pressing device 5 in the embodiment has two pressing elements in the form of pressing strips 19, 20 of different height. They press the workpiece onto the transport path 2 by acting on the profiled top side so that the workpiece is reliably guided and can be precisely machined by the tool 7 seated on the lower spindle 8 when passing through the molding machine.

FIG. 2 shows an adjusting device 21 with which, outside of the molding machine, the pressing strips 19, 20 can be adjusted to the profile of the workpiece. The adjusting device 21 has a base frame 22 which is positioned with height-adjustable legs 23 on a support 24, for example, a workbench or a table. A stand 25 projects vertically from the base frame 22, and a carriage 26 with a spindle 27, which is provided at its free end with a grip 28, is provided on the front side of the stand 25 and is height-adjustable along this front side. A support 31 projects perpendicularly from the end face of the carriage 26 in the vicinity of the lower end and is provided with a feather key 33 extending perpendicularly to the movement direction 32 of the carriage 26. It engages a corresponding fitting groove 34 on the upper longitudinal edge of a carrier or pressing plate 30. On the support 31 a quick clamping device 29 is provided with which the pressing plate or carrier 30 can be clamped onto the carriage 26.

A stop 35 is provided on the pressing plate 30 with which the position of the pressing plate 30 and thus of the pressing strips 19, 20 perpendicularly to the transport direction of the workpiece through the molding machine can be determined. The stop 35 in the embodiment is formed by an L-shaped angle piece which is fastened with one leg on the pressing plate 30. An adjusting screw 36 as a counter stop is provided laterally on the support 31 and projects through a threaded receptacle 37 fastened on a sidewall of the plate-shaped support 31. On the vertical leg of the stop 35 a stop element 38 is provided which is formed preferably by an adjusting screw. It is threaded into a threaded bore in the vertical leg of the stop 35 and secured in the adjusted position, respectively, by a locknut 39. The pressing plate 30 is slipped onto the support 31 to such an extent that the stop element 38 comes to rest on the counter stop 36 on the carrier (FIG. 2). In this way, the two pressing strips 19, 20 can be brought into a precise position relative to the workpiece 14. Since the counter stop 36 and the stop element 38 are formed by an adjusting screw, respectively, the position of the pressing strips 19, 20 transverse to the transport direction of the workpiece through the molding machine can be fine-adjusted in a continuous way.

Figure 3:
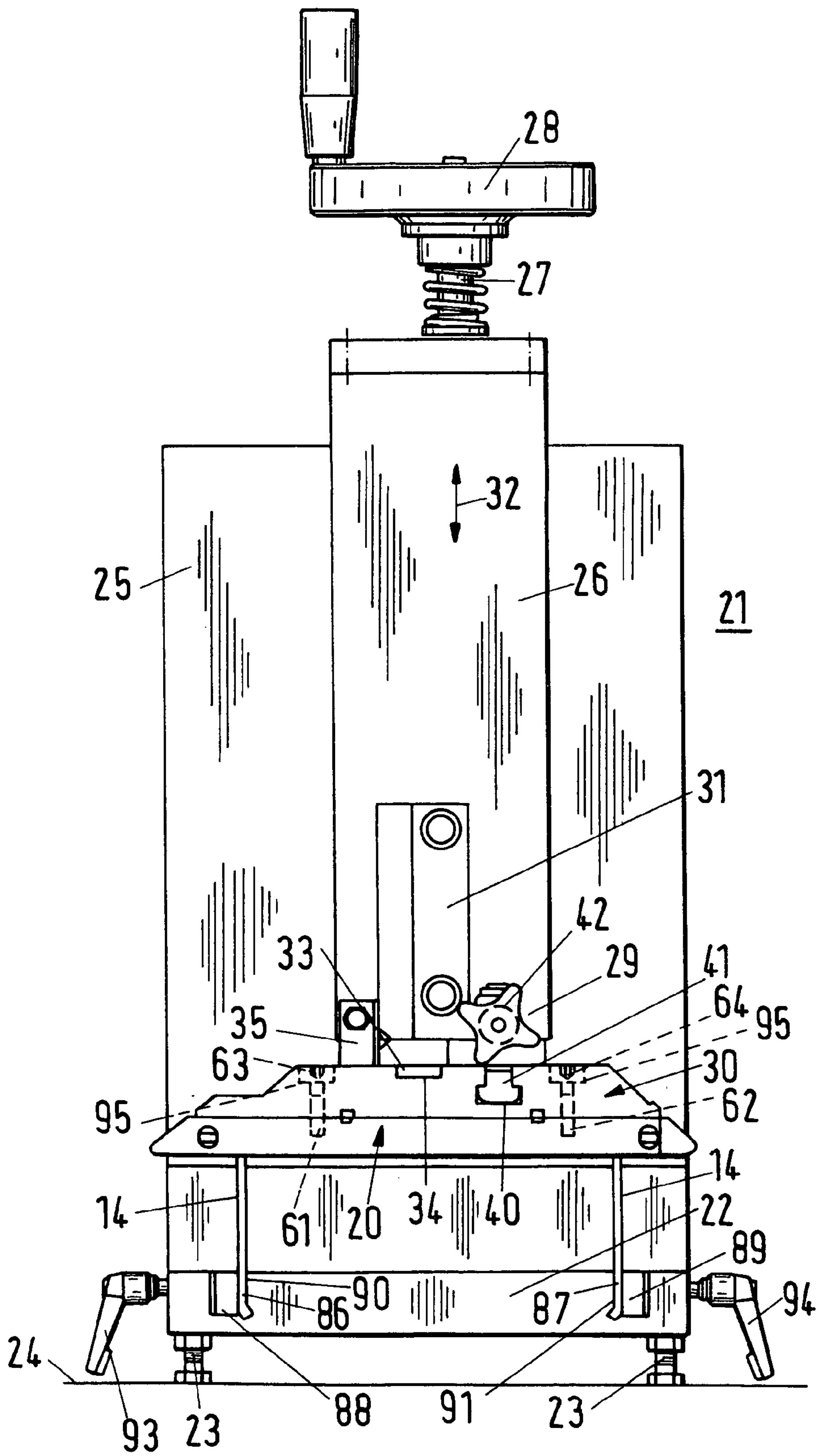
FIG. 3 shows the adjusting device according to FIG. 2 in an end view.

The pressing plate 30, as illustrated in FIG. 3, is provided at its top side with a receptacle in the form of a T-groove 40 which is engaged by a holder in the form of a T-sliding block 41. The pressing plate 30 with the two pressing strips 19, 20 is slipped onto the sliding block 41 wherein at the same time the feather key 33 engages the fitting groove 34 of the pressing plate 30. As soon as the pressing plate 30 has reached its position determined by the stops 36, 38, the pressing plate 30 is clamped by means of the sliding block 41 in the adjusting device 21 by rotating the turn knob 42 of the quick clamping device 29.

Figures 4, 5:
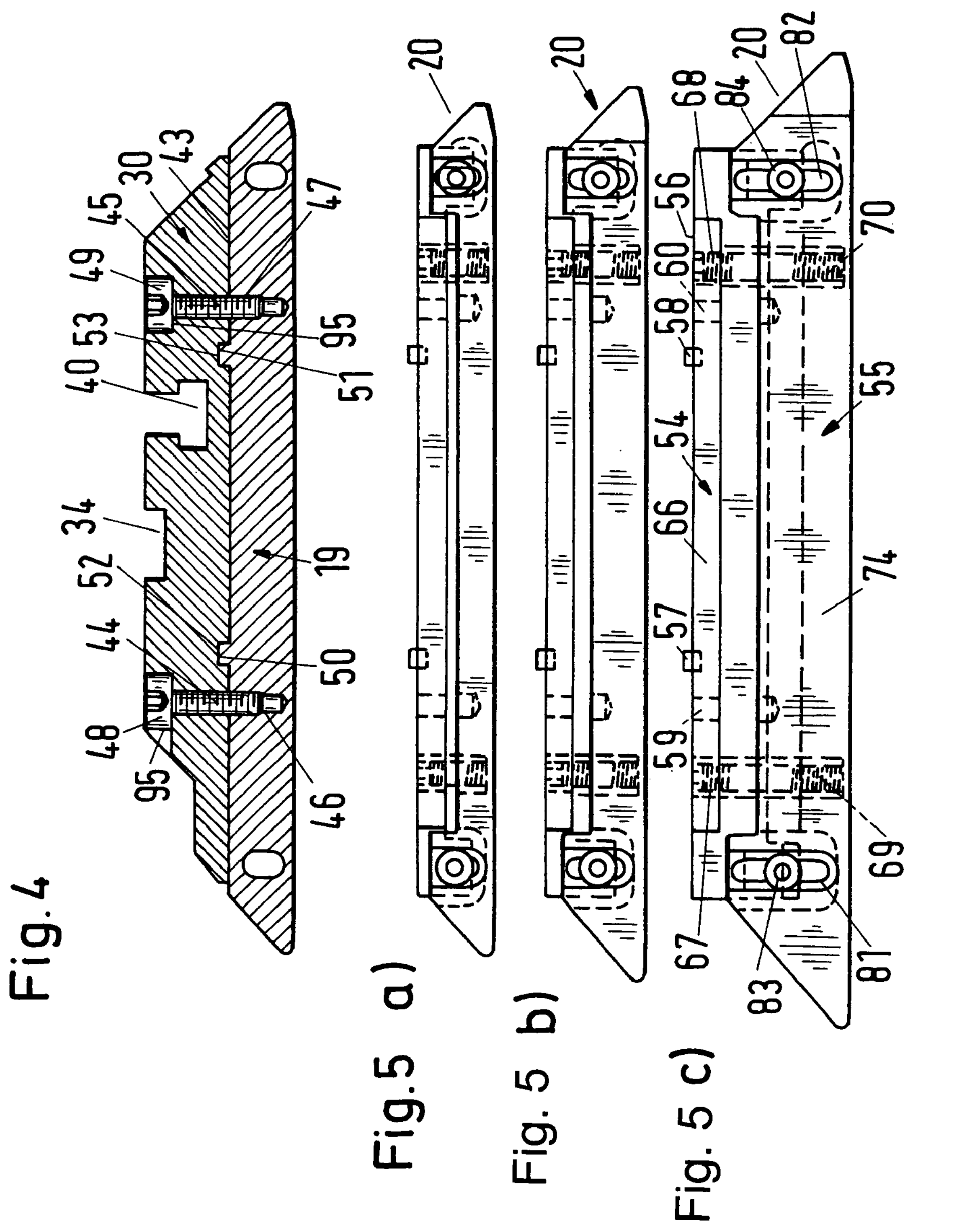
FIG. 4 shows a section of the pressing device according to the invention.

The pressing strip 19 (FIGS. 2 and 4) is screwed onto the underside 43 of the pressing plate 30. For this purpose, fastening screws 44, 45 are provided which are positioned at a spacing to one another and which are threaded from the top side of the pressing plate 30 into threaded bores 46, 47 in the pressing strip 19. The heads 48, 49 of the fastening screws 44, 45 are positioned advantageously countersunk in grooves 95 in the pressing plate 30 which extend across the greater part of the length of the pressing plate 30 (FIGS. 2 and 3) and are provided on its top side. In the bottom of the grooves 95 slotted holes are provided which extend in the longitudinal direction of the grooves and are provided for penetration by fastening screws 44, 45. The fastening screws 44, 45 are positioned in the area adjacent to the feather groove 34 or the T-groove 40. The pressing strip 19 is provided at its edge facing the pressing plate 30 with two keys 50, 51 positioned at a spacing to one another and engaging grooves 52, 53 in the underside of the pressing plate 30. The keys 50, 51 and the grooves 52, 53 extend parallel to the fitting groove 34 or the T-groove 40.

The pressing strip 19 is connected via screws 44, 45 rigidly with the pressing plate 30. By means of the pressing strip 19 the pressing device 5 rests against the profile section of the workpiece projecting farthest past the transport path 2.

The other pressing strip 20 is height-adjustable to a limited extent so that it can be adjusted to the respective profile on the top side of the workpiece. In FIGS. 5*a* to 5*c*, two different pressing strips 20 are illustrated which differ from one another only with regard to their height. The pressing strip 20 according to FIG. 5*a* is, for example, provided for profile depths of a workpiece of between 0 and 5.5 mm. When the profile depth of the workpiece is, for example, between 5.5 and 15.5 mm, the somewhat thicker pressing strips 20 according to FIG. 5*b* is used. For even greater profile depths, in the embodiment, for example, between 15.5 and 35 mm, the pressing strip 20 according to FIG. 5*c* is used. Aside from the difference height, the pressing strips 20 according to FIGS. 5*a* to 5*c* are, however, of identical configuration.

The pressing strip 20 is comprised of two strip elements 54 and 55 which can be adjusted relative to one another to a limited extent. The strip element 54 is a base member and has at its top side 56 two keys 57, 58 which are positioned at a spacing to one another and engage grooves 52, 53 on the underside of the stop plate 30. These grooves 52, 53 extend over the entire length of the stop plate 30. The upper strip element 54 has two threaded bores 59, 60 configured as blind bores into which the fastening screws 61, 62 (FIGS. 2 and 3) are threaded from the top side of the pressing plate 30. The heads 63, 64 of these screws are positioned somewhat recessed in the top side of the pressing plate 30.

Figure 6:
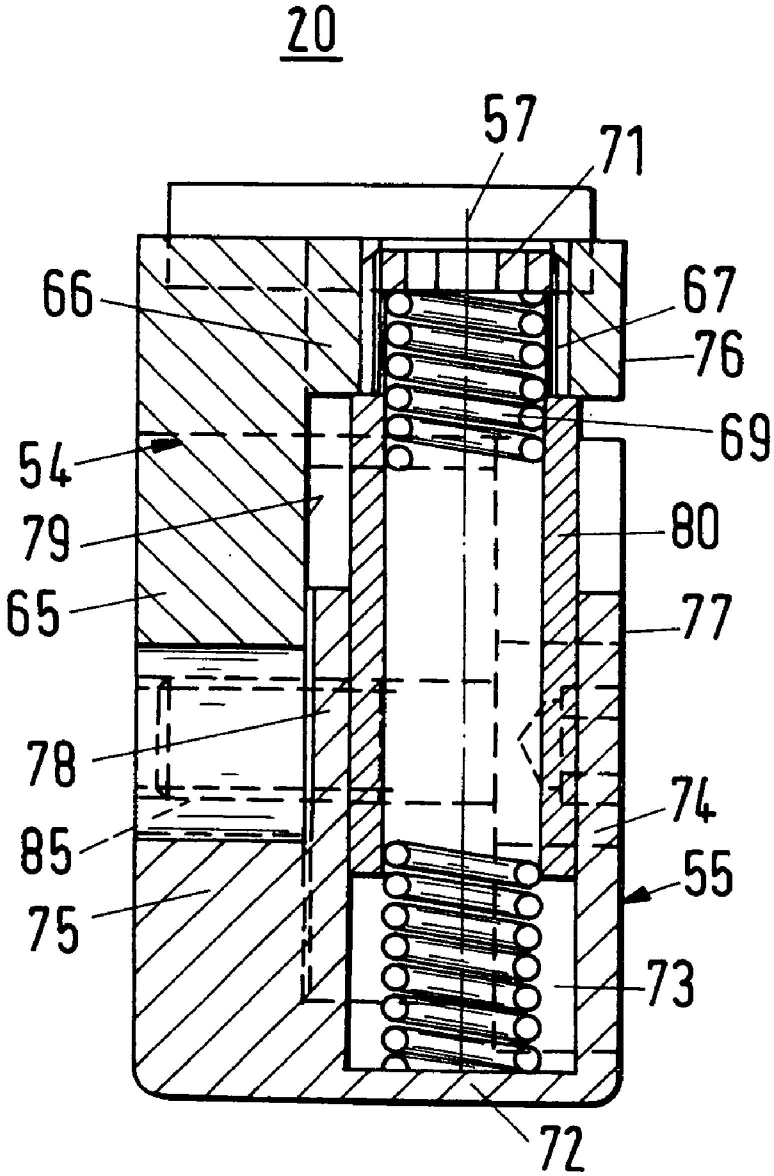
FIG. 6 shows a cross-section of the pressing element according to the invention.

As illustrated in FIG. 6, the strip element 54 has an L-shaped cross-section. One leg 65 forms the rear wall of the pressing strip 20 and the other leg 66 forms the upper end of the pressing strip 20. On this upper horizontal leg 66 the keys 57, 58 are provided. The length of the keys 57, 58 is somewhat smaller than the width of the leg 66. This leg 66 has near its two ends (FIG. 5*c*) two openings 67, 68 through which at least one coil pressure spring 69, 70 can be inserted, respectively, with which the two strip elements 54, 55 are prestressed relative to one another. A closure element 71 (FIG. 6) can be inserted into the openings 67, 68 on which the upper end of the corresponding coil pressure spring 69, 70 is supported. The closure element 71 can be threadable so that the pretension of the springs 69, 70 can be adjusted by means of threading this closure element 71 into the openings 67, 68 to different depths.

The lower end of the pressure spring 69, 70 is supported on the bottom 72 of a recess 73 in the strip element 55. The inner width of the recess 73 is greater than the diameter of the pressure spring 69, 70.

The strip element 55 is a pressing member and is of an L-shaped cross-section. One leg forms the front wall 74 of the pressure strip 21 while the other leg 75 is positioned in the same plane as the rear wall 65 of the strip element 54. The end face 76 of the leg 66 of the strip element 54 and the front side 77 of the front wall 74 of the strip element 55 are positioned in a common plane. The outer side of the leg 65 and 75 of the strip element 54, 55 are positioned in a common plane and parallel to the end face 76 or front side 77 of the two strip elements 54, 55.

The leg 75 of the strip element 55 has a guide portion 78 projecting in the direction toward the leg 66 of the strip element 55 with which the strip element 55 is guided on the front side 79 of the rear wall 65 of the strip element 54 facing the front wall 74 of the strip element 55.

The two pressure springs 69, 70 are received in the area between the leg 66 of the strip element 54 and the leg 74 of the strip element 55 in a sleeve 80 which guides the pressure springs and protects them against soiling and/or damage. The sleeves 80 are positioned on the underside of the leg 66 of the strip element 54 and project into the recesses 73 of the strip element 55.

As illustrated in FIG. 5*c*, the strip element 55 near its two ends is provided with a slot 81, 82, respectively, extending perpendicularly to its longitudinal direction. A clamping screw 83, 84 projects through these slots 81, 82, respectively, and is threaded into a threaded bore 85 in the back wall 65 of the strip element 54. The slots 81, 82 are advantageously recessed in the front wall 74 of the strip element 55 such that the heads of the clamping screws 83, 84 do not project past the front side 77 of the strip element 55.

The pressure strip 20 is fastened with the screws 61, 62 on the underside of the pressure plate 30 in the area adjacent to the pressure strip 19. The two clamping screws 83, 84 are loosened so that the pressure springs 69, 70 move the strip element 55 downwardly in the direction of the templates 14 to such an extent that the strip element 55 will come to rest against them. Now the two clamping screws 83, 84 are tightened so that the two strip elements 54, 55 form a rigid unit. In accordance with the length of the slots 81, 82, the strip element 55 can be adjusted relative to the strip element 54 perpendicularly to the transport direction of the workpieces through the machine. Depending on the profile depth on the top side of the template 14, the pressing strips 20 illustrated in FIGS. 5*a* to 5*c* having different heights are fastened on the pressing plate 30.

In the adjusting device 21, two templates 14 or corresponding workpiece samples are clamped (FIGS. 2 and 3) for the purpose of alignment of the two pressing strips 19, 20. The base frame 22 is provided with recesses 86, 87 for receiving the two templates 14 into which recesses the templates 14 are vertically inserted. They are brought into contact with the stop 96 of the device (FIG. 2) in order to be congruent to one another and reach a defined position of the templates 14 which corresponds to the position of the workpiece in the molding machine. In the recesses 86, 87 the templates 14 are forced by means of at least one clamping element 88, 89, respectively, against the corresponding sidewall 90, 91 of the depressions 86, 87. For actuation the clamping elements 88, 89 the corresponding quick clamping devices 92 to 94 are provided. With them, the clamping elements 88, 89 can be simply and quickly clamped or released. The recesses 86, 87 extend perpendicularly to the pressing strips 19, 20 up to the end face of the base frame 22 (FIGS. 2 and 3). Accordingly, the clamping elements 88, 89 extend advantageously across the length of the recesses 86, 87.

The templates 14 are manufactured like the templates for the tools, for example, based on CAD drawings for the workpiece or for the tool to be used for profiling. The profiled top side of these profile templates 14 correspond to the profile to be manufactured on the top side of the workpiece.

In order to be able to optimally support in the molding machine a workpiece that is to be machined on its profiled top side, first a template 14 or pattern or the like corresponding to this workpiece is produced first in the described way. Two identical templates 14 are clamped into the adjusting device 21 and are inserted into the recesses 86, 87 of the base frame 22 up to the stop 96. Now the two templates 14 are clamped by means of the quick clamping devices 92 to 94. The stop 96 for the templates 14 corresponds in its position to the corresponding stop in the machine for the workpiece to be machined. Subsequently, the pressing strip 19 is fastened in the described way on the underside of the pressing plate (stop plate) 30. As illustrated in FIG. 2, this pressing strip 19 is arranged on the highest point of the profile of the template 14. Depending on the position of this highest point of the profile, the pressing strip 19 is fastened at the corresponding location on the pressing plate 30 in the described way. Since the pressing plate 30 at its top side is provided with grooves 95 and the slotted holes for the fastening screws 44, 45 are provided in the bottom of these grooves, the pressing strip 19 can be positioned precisely relative to the highest point of the profile of the templates 14. This adjusting direction of the pressing strip 19, 20 corresponds in the machine to the axial direction of the corresponding spindle 3 supporting the tool. In the same way, the pressing strip 20 is positioned and clamped on another point of the profile of the templates 14 on the underside of the pressure plate 30. Advantageously, positioning and clamping of the pressing strips 19, 20 on the pressure plate 30 is realized when it has been moved upwardly by means of the threaded spindle 27 and the carriage 26. In this position, the pressing strips 19, 20 can be fastened without difficulty on the underside of the pressure plate 30. Subsequently, the carriage 27 is lowered by actuation of the grip 28 to such an extent that the pressing strip 19 rests against the highest profile point of the template 14. The threaded spindle 27 is surrounded by a coil pressure spring 97 in the area between the carriage 26 and the grip 28. The spring 97 ensures that the pressing strip 19 impacts cleanly on the templates 14 when the carriage 26 is moved so that damage of the templates 14 caused by the pressing strip 19 is prevented.

In the basic position the two strip elements 54, 55 are positioned to one another such that the pressing strip 20 has its minimum thickness. The clamping screws 83, 84 of the pressing strip 20 are now loosened so that the pressure springs 69, 70 move the strip element 55 in the direction toward the templates 14 until it comes to rests against them (FIG. 2). Now the clamping screws 83, 84 are tightened in order to connect the two strip elements 54, 55 of the pressing strip 22 to a rigid unit.

Depending on the configuration of the profile of the templates 14 further pressing strips 20 can be provided which, in the described way, are fastened on the underside of the pressure plate 30 and are also comprised of two strip elements 54, 55 moveable relative to one another. It is moreover possible to change the position of the strip elements 19, 20 when the highest point of the profile of the templates 14 is provided on the other side.

The pressing plate 30 with the adjusted pressing strip 19, 20 forms an exchangeable cassette which, after loosening the quick clamping device 29, can be removed from the adjusting device 21 and inserted into the molding machine which has the same type of quick clamping device. The stop position of the pressing plate 30 by means of the stops 36, 38 in the adjusting device 21 corresponds to the conditions within the molding machine. Accordingly, after adjustment, the pressing plate 30 with the pressing strips 19, 20 must be inserted into the molding machine only to such an extent that the pressing plate 30 is in its stop position. In this way, the pressing strips 19, 20 are positioned in the precise position with regard to the workpiece to be machined and passing through underneath.

The two pressing devices 4, 5 (FIG. 1) in the machine are adjusted in the manner known in the art relative to the tool seated on the spindle 3 by taking into account the smallest described circle diameter 16 of the tool and the molding depth of the profiled cutting blades of this tool. The pressing or stop plate 30 and the pressing strip 19 form in this respect a point of reference for this adjustment.

The described pressing device 5 in the form of the exchangeable cassette is used for quick and simple retrofitting of the machine. This exchangeable cassette is adjusted outside the molding machine on the adjusting device 21 in the way described above. Such an exchangeable cassette can also be used for pressing relative to the left spindle and/or for pressing relative to top or left spindle of the machine.

While specific embodiments of the invention have been shown and described in detail to illustrate the inventive principles, it will be understood that the invention may be embodied otherwise without departing from such principles.

What is claimed is:

1. A method for adjusting at least one pressing element of a machine for machining workpieces of wood or plastic material relative to a workpiece of wood or plastic material, which workpiece is transported through the machine and is to be machined by the machine, the method comprising the steps of:

adjusting the pressing element outside of the machine in an adjusting device; and inserting the pressing element into the machine after adjusting;

wherein, in the step of adjusting, a carrier is provided in the adjusting device and the pressing element is adjusted in the adjusting device on the carrier, wherein the carrier is inserted into the machine together with the pressing element after adjustment.

2. The method according to claim 1, wherein, in the step of adjusting, the pressing element is adjusted relative to a template or a sample of the workpiece, wherein the template or sample of the workpiece has on a side facing the pressing element the same profile as the corresponding side of the workpiece to be manufactured.

3. The method according to claim 2, wherein, in the step of adjusting, two templates are inserted into the adjusting device at a spacing behind one another and congruent to one another.

4. The method according to claim 3, wherein, in the step of adjusting, the pressing element is adjusted transversely to a straight line connecting the two templates.

5. The method according to claim 1, wherein, in the step of adjusting, the pressing element in the adjusting device is moved transversely to a longitudinal direction of the pressing element into a stop position which matches a stop position of the pressing element in the machine.

6. The method according to claim 1, wherein the carrier is moved into a stop position in the adjusting device and wherein the stop position in the adjusting device corresponds to the stop position of the carrier in the machine.

7. The method according to claim 1, wherein the pressing element is adjusted in a direction transversely to a longitudinal axis of the carrier.

8. An adjusting device for adjusting at least one pressing element of a machine for machining workpieces of wood or plastic material relative to a workpiece of wood or plastic material, which workpiece is transported through the machine and is to be machined by the machine, outside the machine, wherein the pressing element is inserted into the machine after adjusting, the adjusting device comprising:

support;

a holder connected to the support and adapted to receive a carrier on which a pressing element is provided;

wherein the carrier is provided in the adjusting device and the pressing element is adjusted in the adjusting device on the carrier, wherein the carrier is inserted into the machine together with the pressing element after adjustment.

9. The device according to claim 8, wherein the support has a counter stop adapted to interact with at least one stop of the carrier.

10. The device according to claim 9, wherein the at least one stop and the counter stop are position-adjustable.

11. The device according to claim 10, wherein the at least one stop and the counter stop are continuously adjustable.

12. The device according to claim 9, wherein the at least one stop is an angle piece provided on the carrier.

13. The device according to claim 12, wherein the angle piece has an adjusting screw acting as a stop element.

14. The device according to claim 9, wherein the counter stop is an adjusting screw.

15. The device according to claim 8, wherein the holder is a positive-locking element engaging the carrier.

16. The device according to claim 15, wherein the positive-locking element is a sliding block engaging a groove provided on the carrier.

17. The device according to claim 8, wherein the carrier can be clamped by a holder.

18. The device according to claim 8, wherein the carrier has an underside and at least one pressing element arranged on the underside.

19. The device according to claim 18, wherein the pressing element is detachably connected to the carrier.

20. The device according to claim 18, wherein at least two of the pressing elements are provided and wherein the at least two pressing elements are different.

21. The device according to claim 20, wherein a first one of the at least two pressing elements is rigid and fixedly connected to the carrier.

22. The device according to claim 21, wherein a second one of the at least two pressing elements is comprised of at least a first part and a second part, of which the first part is fixedly connected on the carrier and the second part is adjustable relative to the first part.

23. The device according to claim 20, wherein the carrier and one of the at least two pressing elements form an exchangeable cassette.

24. A pressing element of a machine for machining workpieces of wood or plastic material, the pressing element adjustable relative to a workpiece of wood or plastic material outside the machine, which workpiece is transported through the machine and is to be machined by the machine, wherein the pressing element is inserted into the machine after adjusting, wherein the pressing element comprises a strip-shaped base member and at least one pressing member moveably supported on the base member, wherein, for adjusting the pressing element, a carrier is provided in an adjusting device and the pressing element is adjusted in the adjusting device on the carrier, wherein the pressing element after adjustment is inserted into the machine together with the carrier.

25. The pressing element according to claim 24, wherein the base member and the pressing member are prestressed by springs against one another.

26. The pressing element according to claim 25, wherein the springs are arranged within the base member, the pressing member, or the base member and the pressing member.

27. The pressing element according to claim 26, further comprising sleeves, wherein the springs are positioned at least with a portion of their length in one of the sleeves.

28. The pressing element according to claim 24, wherein the base member and the pressing member can be clamped against one another.

29. The pressing element according to claim 28, comprising at least one clamping screw configured to be screwed into the base member, wherein the pressing member has a slotted hole through which the at least one clamping screw projects, wherein a head of the at least one clamping screw is tightened against the pressing member.

30. The pressing element according to claim 29, wherein a length of the slotted hole limits an adjusting path of the pressing member relative to the base member.

31. A method of adjusting at least one pressing element of a molding machine, the method comprising the steps of:

positioning a template of a workpiece to be machined in an adjusting device;

adjusting at least one pressing element relative to the template so that the at least one pressing element is in a precise position relative to the workpieces to be machined on the molding machine;

subsequently removing the at least one pressing element from the adjusting device and inserting the at least one pressing element into the molding machine;

wherein, in the step of adjusting, a carrier is provided in the adjusting device and the at least one pressing element is adjusted in the adjusting device on the carrier, wherein the carrier is inserted into the molding machine together with the at least one pressing element.

32. The method according to claim 31, wherein the template has at least on one side the same profile as the workpiece to be machined.

* * * * *